(12) United States Patent
Bi (10) Patent No.: US 10,901,886 B2
(45) Date of Patent: Jan. 26, 2021

(54) HARDWARE-BASED FLASH FTL FUNCTION REALIZATION METHOD AND DATA STORAGE DEVICE THEREOF

(71) Applicant: SHANDONG STORAGE WINGS ELECTRONICS TECHNOLOGY CO., LTD., Yantai (CN)

(72) Inventor: Jianzhong Bi, Yantai (CN)

(73) Assignee: SHANDONG STORAGE WINGS ELECTRONICS TECHNOLOGY CO., LTD., Yantai (CN)

(*) Notice: Subject to any disclaimer, the term of this patent is extended or adjusted under 35 U.S.C. 154(b) by 0 days.

(21) Appl. No.: 15/822,160

(22) Filed: Nov. 26, 2017

(65) Prior Publication Data

US 2019/0087322 A1 Mar. 21, 2019

(30) Foreign Application Priority Data

Sep. 19, 2017 (CN) .......................... 2017 1 0852048

(51) Int. Cl.
*G06F 12/02* (2006.01)
*G06F 3/06* (2006.01)
*G06F 9/448* (2018.01)
*G06F 12/1009* (2016.01)

(52) U.S. Cl.
CPC .......... *G06F 12/0246* (2013.01); *G06F 3/061* (2013.01); *G06F 3/064* (2013.01); *G06F 3/0619* (2013.01); *G06F 3/0632* (2013.01); *G06F 3/0679* (2013.01); *G06F 9/4498* (2018.02); *G06F 12/0253* (2013.01); *G06F 12/1009* (2013.01)

(58) Field of Classification Search
None
See application file for complete search history.

(56) References Cited

U.S. PATENT DOCUMENTS

| | | | | |
|---|---|---|---|---|
| 5,937,423 | A * | 8/1999 | Robinson | G06F 3/0607 365/52 |
| 6,279,069 | B1 * | 8/2001 | Robinson | G11C 16/06 710/10 |
| 9,189,385 | B2 * | 11/2015 | Cohen | G06F 12/0246 |
| 2004/0085849 | A1 * | 5/2004 | Myoung | G06F 12/0246 365/232 |
| 2007/0088940 | A1 * | 4/2007 | M. Conley | G11C 16/20 713/1 |
| 2010/0082890 | A1 * | 4/2010 | Heo | G06F 12/0246 711/103 |
| 2011/0302358 | A1 * | 12/2011 | Yu | G06F 13/28 711/103 |
| 2016/0034206 | A1 * | 2/2016 | Ryan | G11C 16/349 711/103 |

* cited by examiner

*Primary Examiner* — Michael Alsip
(74) *Attorney, Agent, or Firm* — JCIPRNET (57) ABSTRACT

Disclosed in an embodiment of the present invention are a hardware-based flash FTL function realization method and data storage device thereof, wherein the method comprises: when the data storage device is powered on, a state machine identifies the flash chip to acquire the chip information of the flash chip; the state machine establishes a target table according to the chip information; and the state machine realizes the FTL function of the flash controller according to the target table, wherein the FTL function comprises an address mapping function, a bad block management function and a garbage collection function.

10 Claims, 6 Drawing Sheets

---

When the data storage device is powered on, a state machine identifies the flash chip to acquire the chip information of the flash chip; — S101

↓

The state machine establishes a target table according to the chip information; and — S102

↓

The state machine realizes the FTL function of the flash controller according to the target table. — S103

HARDWARE-BASED FLASH FTL FUNCTION REALIZATION METHOD AND DATA STORAGE DEVICE THEREOF

RELATED APPLICATION

The present application claims priority to the Chinese patent application CN201710852048.9 filed Sep. 19, 2017, which is incorporated herein by reference in its entirety.

FIELD OF THE INVENTION

The present invention relates to the technical field of computers. Particularly, this invention describes a hardware-based flash FTL function realization method and data storage device thereof.

BACKGROUND OF THE INVENTION

Generally, the system manufacturer of a storage device such as a solid state disk and the like must perform firmware transplantation after obtaining a controller, namely realize the flash translation layer (FTL) function of a flash controller, wherein the FTL function comprises address mapping, bad block management and garbage collection. However, the FTL function is realized at present via mostly software. Such method has the following problems: (1) the system manufacturer requires time for transplantation, thus delaying the marketing process of a product; and (2) the program codes are redundant, thus the method is time consuming and labor intensive, and has a low work efficiency.

OBJECTS AND SUMMARY OF THE INVENTION

The object of the embodiment of the present invention is to provide a hardware-based flash FTL function realization method and data storage device thereof, so as to accelerate the marketing process of a product and improve work efficiency.

To achieve the above object, in a first aspect, the embodiment of the present invention provides a hardware-based flash FTL function realization method, applied to a data storage device; the data storage device comprises a flash controller and a flash chip, wherein the flash controller comprises a state machine; the method comprises:

When the data storage device is powered on, the state machine identifies the flash chip to acquire the chip information of the flash chip;

The state machine establishes a target table according to the chip information; and The state machine realizes the FTL function of the flash controller according to the target table, wherein the FTL function comprises an address mapping function, a bad block management function and a garbage collection function.

As an alternative embodiment, the step that the state machine identifies the flash chip to acquire the chip information of the flash chip, specifically comprises:

The state machine adopts a channel and a chip selection unit to read the ID and manufacturer information of the flash chip; and The state machine searches a preset hardware table according to the ID and the manufacturer information to acquire the chip information of the flash chip.

As an alternative embodiment, the chip information comprises the block number, block size, page number and page size of the flash chip; and the target table comprises a first table and a second table, wherein the first table is established according to the blocks of all the flash chips on each channel, and the second table is established according to the pages of the flash chips.

As an alternative embodiment, the step that the state machine realizes the address mapping function according to the target table, specifically comprises:

The state machine adopts a first index to search the first table or the second table, and adopts a second index to compare with a logic address to realize the address mapping function.

As an alternative embodiment, the second table is used for managing the states of the pages; and the step that the state machine realizes the bad block management function according to the target table, specifically comprises:

The state machine determines the state of each page according to the number of bad bits on each page in the second table and an error correction code technique; and The state machine realizes the bad block management function according to the state of each page.

As an alternative embodiment, the second table is used for managing the use and allocation of the pages; and the step that the state machine realizes the garbage collection function according to the target table, specifically comprises:

The state machine determines a wear leveling value according to the first table, and realizes the garbage collection function according to the wear leveling value.

As an alternative embodiment, the method further comprises:

The state machine establishes a series according to a garbage collection result.

In a second aspect, the embodiment of the present invention provides a data storage device, comprising a data interaction flash controller and a flash chip, wherein the flash controller comprises a state machine, and the state machine is used for:

When the data storage device is powered on, identifying the flash chip to acquire the chip information of the flash chip;

Establishing a target table according to the chip information; and

Realizing the FTL function of the flash controller according to the target table, wherein the FTL function comprises an address mapping function, a bad block management function and a garbage collection function.

As an alternative embodiment, the state machine is further used for:

Adopting a channel and a chip selection unit to read the ID and manufacturer information of the flash chip;

Searching a preset hardware table according to the ID and the manufacturer information to acquire the chip information of the flash chip; and Uploading the chip information to the flash chip.

As an alternative embodiment, the target table comprises a first table and a second table, wherein the first table is established according to the block number of all the flash chips on each channel, and the second table is established according to each block; and the state machine is further used for:

Adopting a first index to search the first table or the second table, and adopting a second index to compare with a logic address to realize the address mapping function;

Realizing the bad block management function according to the number of bad bits on each page in the second table and an error correction code technique; and Determining a wear leveling value according to the first table, and realizing the garbage collection function according to the wear leveling value.

The hardware-based flash FTL function realization method and data storage device thereof provided by the embodiment of the present invention first adopts a state machine to first identify a flash chip to acquire the chip information of the flash chip, then establish a target table according to the chip information, and finally realize the FTL function of the flash controller according to the target table, wherein the FTL function comprises an address mapping function, a bad block management function and a garbage collection function. Namely, the embodiment of the present invention realizes the three functions of the flash controller via a state machine in a hardware-based manner, thus accelerating the marketing process of a product. Furthermore, the hardware-based FTL function realization process in the embodiment of the present invention does not require a program code, thus improving work efficiency.

BRIEF DESCRIPTION OF FIGURES

In order to clearly illustrate the embodiments of the present invention or the technical solution in the prior art, the drawings required for the description of the embodiments or the prior art will be briefly introduced hereafter. In all the drawings, the similar elements or parts are generally denoted with similar drawing marks. In the drawings, the elements and parts are not necessarily drawn in an actual proportion.

DETAILED DESCRIPTION OF THE EMBODIMENTS

The embodiments of technical solution of the present invention will be described in detail in connection with the attached drawings. The following embodiments only serve as examples to illustrate the technical solution of the invention and not be given to limit the scope of protection of the invention.

It shall be noted that unless otherwise mentioned, all technical and scientific terms used herein have the same meaning as commonly understood by one of ordinary skill in the art to which the invention belong.

The method provided by the embodiment of the present invention is applied to a data storage device; the data storage device comprises a flash controller and a flash chip, wherein the flash controller comprises a state machine.

Figure 1:
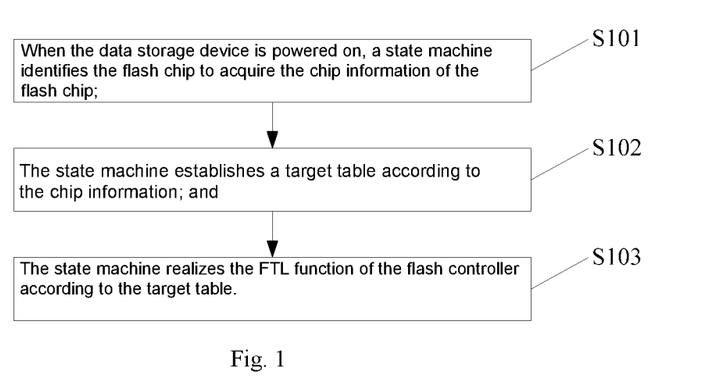
FIG. 1 is a flow chart of the hardware-based flash FTL function realization method according to the first embodiment of the present invention.

Please refer to FIG. 1 which is a flow chart of the hardware-based flash FTL function realization method according to the first embodiment of the present invention. As shown in the figure, the method can comprise the following steps:

S101, when the data storage device is powered on, a state machine identifies the flash chip to acquire the chip information of the flash chip;

S102, the state machine establishes a target table according to the chip information; and S103, the state machine realizes the FTL function of the flash controller according to the target table, wherein the FTL function comprises an address mapping function, a bad block management function and a garbage collection function.

The embodiment of the present invention realizes the three functions of the flash controller via a state machine in a hardware-based manner, thus accelerating the marketing process of a product. Furthermore, the hardware-based FTL function realization process in the embodiment of the present invention does not require a program code, thus improving work efficiency.

Figure 2:
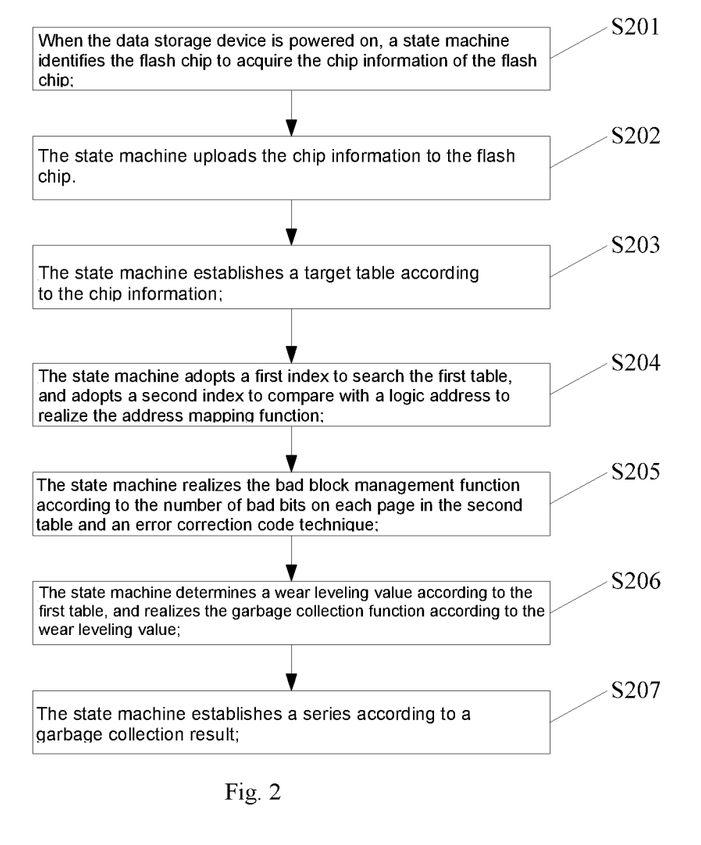
FIG. 2 is a flow chart of the hardware-based flash FTL function realization method according to the second embodiment of the present invention.

Please refer to FIG. 2 which is a flow chart of the hardware-based flash FTL function realization method according to the second embodiment of the present invention. As shown in the figure, the method can comprise the following steps:

S201, when the data storage device is powered on, a state machine identifies the flash chip to acquire the chip information of the flash chip.

Figure 3:
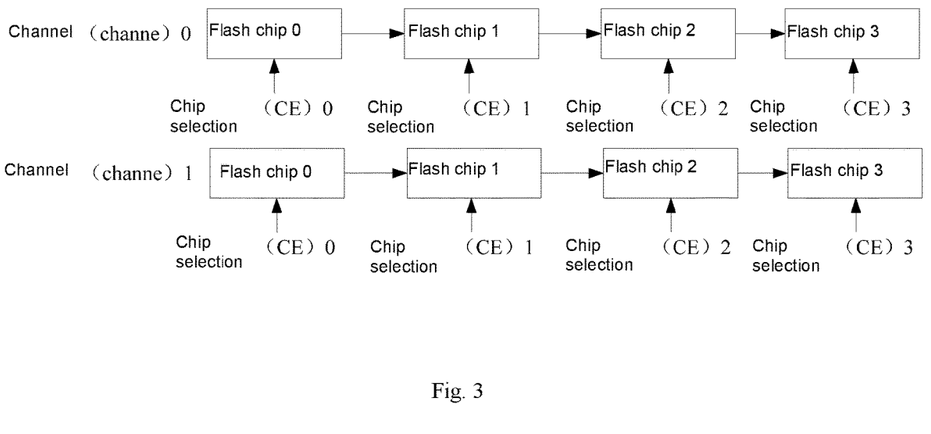
FIG. 3 is a schematic view of a reading action.

When the flash chip is inserted in the flash controller, the state machine can adopt a channel and a chip selection unit to read the ID and manufacturer information of the flash chip; and the schematic view of a reading action is as shown in FIG. 3. Afterwards, the state machine searches a preset hardware table according to the ID and the manufacturer information to acquire the chip information of the flash chip, such that the state machine can automatically identify the flash chip. Namely, the process of identifying the flash chip by the state machine is the process of acquiring the chip information of the flash chip; and the subsequent steps of realizing the functions of the flash controller on the basis of hardware are all performed on the basis of the chip information, wherein the chip information comprises the block number, block size, page number and page size of the flash chip.

It should be noted that in the above reading operation, the flash chips are all independent, and the products of a plurality of manufacturers can be mixed for use. Furthermore, by adopting the above manner, the state machine can automatically identify the flash chips of different manufacturers without making any modification to the software.

It should be further noted that the flash controller and the flash chips are mounted on a printed circuit board; and before the method provided by the embodiment of the present invention is implemented, an initialization action is first completed to establish a block or page based table.

S202, the state machine uploads the chip information to the flash chip.

The state machine uploads the chip information, such as the block number, block size, page number and page size of the flash chip, to the flash chip.

S203, the state machine establishes a target table according to the chip information.

The target table comprises a first table and a second table, wherein the first table is established according to the blocks of all the flash chips on each channel; and the second table is established according to the pages of the flash chips, and is used for managing the allocation and use of the pages.

Specifically, the state machine establishes a table (namely a first table, table 1) for the blocks of all the flash chips on each channel. In table 1, each cell denotes a good or bad block.

TABLE 1

| Chip 0 | $blk0_0$ | ... | blkN0 (block 0) |
| Chip 1 | $blk0_1$ | ... | blkN1 (block 1) |
| Chip 2 | $blk0_2$ | ... | blkN2 (block 2) |
| Chip 3 | $blk0_3$ | ... | blkN3 (block 3) |

The state machine further establishes another table (namely a second table, table 2) for each block.

TABLE 2

| Block 0 | $pg0_0$ | ... | pgN0 (page 0) |
| Block 1 | $pg0_1$ | ... | pgN1 (page 1) |
| Block 2 | $pg0_2$ | ... | pgN2 (page 2) |
| Block 3 | $pg0_3$ | ... | pgN3 (page 3) |

S204, the state machine adopts a first index to search the first table, and adopts a second index to compare with a logic address to realize the address mapping function.

Figure 4:
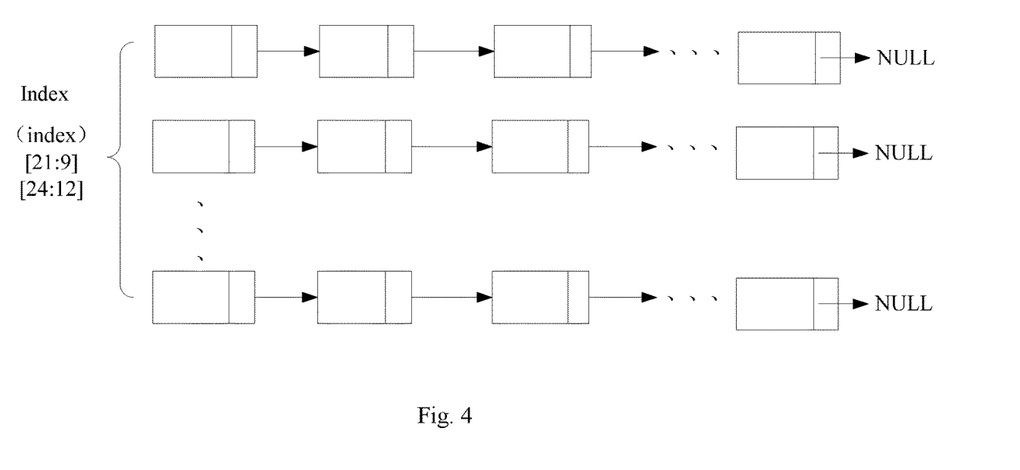
FIG. 4 is a schematic view of a series.

The case of mapping a 32 bit address to a 13 bit address is taken as an example for description. For a 32 bit address, when the block size is 512 bytes, the index [21: 9] is used as the index of the first table or the second table; and when the block size is 2048 bytes, the index [24: 12] is used as the index of the first table or the second table. It should be noted that address mapping mainly refers to mapping a logic address to a physical address. Specifically, the state machine first uses the first index [21: 9] or [24: 12] to search the first table or the second table, and then uses a second index [31: 22] [31: 25] as a data comparison logic address; if the address is found to be a new address, then the address is added behind the series to form a new series, wherein the schematic view of a series is as shown in FIG. 4. The FIG. 4 is illustrated as follows: each description metadata in the figure has a cell; the block/page denotes that the address is in units of block or page; the address cell stores logic addresses and physical addresses; and the length cell denotes the length of data. Further, the case of mapping a 32 bit address to a 13 bit table is taken as an example; 13 bit address is defined as a first sequence, and the bits obtained after deducting the bits of the block/page from the remaining 19 bits are defined as a second sequence; when in mapping, if repeated entries are found, then a series is established in precedence order.

S205, the state machine realizes the bad block management function according to the number of bad bits on each page in the second table and an error correction code technique.

When table 2 established on the basis of blocks is used for managing the states of pages, table 2 is illustrated as follows: (1) each cell denotes the state of a page; any one page on which the number of bad bits is in the error correction capability of the error correction code (ECC) technique is considered to be a good page, and is marked as good; and any one page on which the bad bit data is beyond the error correction capability of the ECC technique is considered to be a bad page, and is marked as bad; and (2) the number of bad bits is the number of error data obtained after completing an ECC each time.

According to table 2, the state machine determines the state of a page in a block according to the number of bad bits on each page in the second table and an error correction code technique. When all the pages in a block are marked as bad, the block is marked to be a bad block at a position in the first table where the block is located, and will not be purged for use in the future, thus realizing the bad block management function.

S206, the state machine determines a wear leveling value according to the first table, and realizes the garbage collection function according to the wear leveling value.

When the first table (table 1) is used for garbage collection, the first table comprises a plurality of cells, and each cell has the following description metadata to record the characteristics of each block: (1) used or not; (2) program/erase cycles; (3) number of used pages; (4) data use frequency; and (5) composite score. Further, when the state machine collects garbage, each block will establish a table just as table 2 to manage the allocation of pages. At this time, the description metadata of each cell in table 2 is as follows: 1 denotes that the page is used, and 0 denotes that the page is not used.

Specifically, when the state machine collects garbage, the composite score will obtain a wear leveling value according to the above description metadata such as the program/erase cycles, and then the state machine collects garbage according to the wear leveling value.

S207, the state machine establishes a series according to a garbage collection result;

After the state machine completes the garbage collection, the state machine will obtain a garbage collection result indicating the page is used or not; if the page is not used, then each channel establishes a series which has description metadata to describe which flash chip and which block the page belongs to.

The hardware-based flash FTL function realization method provided by the embodiment of the present invention adopts a state machine to first identify a flash chip to acquire the chip information of the flash chip, then establish a target table according to the chip information, and finally realize the address mapping function, bad block management function and garbage collection function of the flash controller according to the target table. Namely, the embodiment of the present invention realizes the three functions of the flash controller via a state machine in a hardware-based manner, thus accelerating the marketing process of a product. Furthermore, the hardware-based FTL function realization process in the embodiment of the present invention does not require a program code, thus improving work efficiency. Moreover, the method reduces flash controller power consumption and product manufacturing cost.

In addition, to implement the method provided by the embodiment of the present invention, just like a user neither requires to consider the speed of a network entity layer is 10 Mbps, 100 Mbps or 1000 Mbps, nor requires to consider the materials are coaxial or optical fiber; as long as a network cable is inserted, the bottom layer will perform negotiation automatically, such that a manufacturer can replace a flash chip just like using a network which can be used once inserted, thus greatly facilitating the user.

Figure 5:
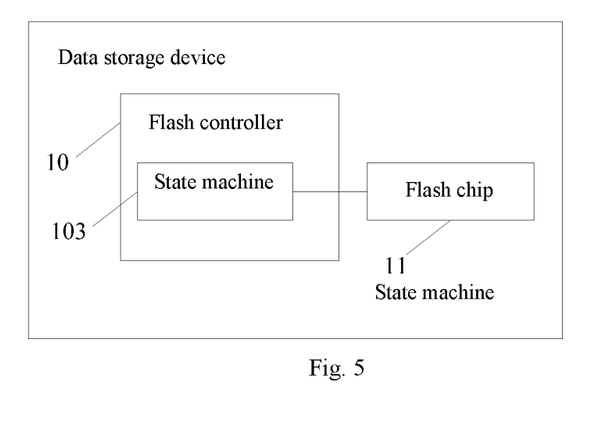
FIG. 5 is a structural schematic view of the data storage device according to the first embodiment of the present invention.

Correspondingly, the embodiment of the present invention further provides a data storage device. As shown in FIG. 5, the data storage device comprises a data interaction flash controller 10 and a flash chip 11, wherein the flash controller 10 comprises a state machine 101.

Wherein the state machine 103 is used for:

When the data storage device is powered on, identifying the flash chip to acquire the chip information of the flash chip;

Establishing a target table according to the chip information; and

Realizing the FTL function of the flash controller according to the target table, wherein the FTL function comprises an address mapping function, a bad block management function and a garbage collection function.

Further, the state machine 103 is specifically used for:

Adopting a channel and a chip selection unit to read the ID and manufacturer information of the flash chip;

Searching a preset hardware table according to the ID and the manufacturer information to acquire the chip information of the flash chip; and Uploading the chip information to the flash chip.

Further, the target table comprises a first table and a second table, wherein the first table is established according to the block number of all the flash chips on each channel, and the second table is established according to each block; and the state machine 13 is specifically used for:

Adopting a first index to search the first table or the second table, and adopting a second index to compare with a logic address to realize the address mapping function;

Realizing the bad block management function according to the number of bad bits on each page in the second table and an error correction code technique; and Determining a wear leveling value according to the first table, and realizing the garbage collection function according to the wear leveling value; and Establishing a series according to a garbage collection processing result.

It should be noted that the data storage device provided by the embodiment of the present invention is used for a product taking a flash memory as a main body, can be specifically any one of, but not limited to the following devices: (1) universal serial bus flash device (USB flash device); (2) solid state disk (SSD); (3) embedded flash memory module (e.g. an eMMC, eMCP); (4) general flash memory (e.g. a UFS); and (5) SD card or secure digital input and output card (SDIO).

The data storage device provided by the embodiment of the present invention realizes the three functions of the flash controller via a state machine in a hardware-based manner, thus accelerating the marketing process of a product, and reducing flash controller power consumption and product manufacturing cost. Furthermore, the hardware-based FTL function realization process in the embodiment of the present invention does not require a program code, thus improving work efficiency.

Figure 6:
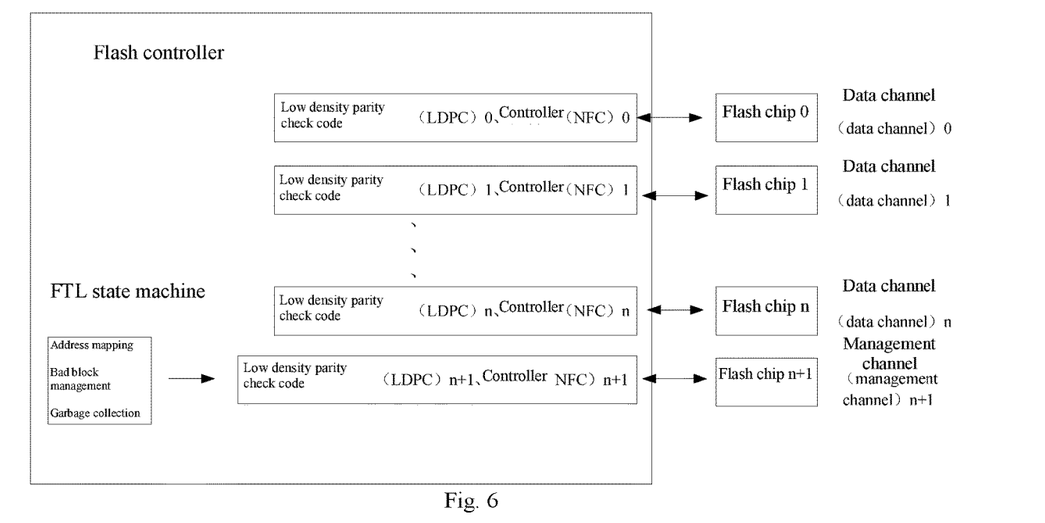
FIG. 6 is a structural schematic view of the data storage device according to the second embodiment of the present invention.

With reference to FIG. 6, in another embodiment of the present invention, the data storage device comprises a flash controller and a plurality of flash chips. Further, an FTL state machine, a plurality of low density parity check codes (LDPC), and a plurality of NAND flash controllers (NFC) are integrated inside the flash controller, wherein the FTL state machine is used for executing the address mapping function, the bad block management function and the garbage collection function; each LDPC and NFC correspond to one flash chip and a channel; $LDPC_0$ and $NFC_0$ correspond to the flash chip 0 and the data channel 0; and $LDPC_1$ and $NFC_1$ correspond to the flash chip 1 and the data channel 1; by analogy, $LDPC_n$ and $NFC_n$ correspond to the flash chip n and the data channel n. The FTL state machine interacts data with $LDPC_{n+1}$ and $NFC_{n+1}$, and further corresponds the flash chip n+1; the flash chip n+1 corresponds to a management channel; the management channel is out of band, namely does not occupy data bandwidth.

The above various embodiments are only used to illustrate the technical solution of the present invention without limitation; and despite reference to the aforementioned embodiments to make a detailed description for the present invention, an ordinary person skilled in the art should understand: the described technical solution in above various embodiments can be modified or the part of or all technical features can be equivalently substituted; and the modifications or substitutions do not make the essence of the corresponding technical solutions deviate from the scope of the technical solutions of the embodiments of the present invention, all of which should be contained within the scope of the claims and description of the present invention.

What is claimed is:

1. A hardware-based flash FTL function realization method, applied to a data storage device which comprises a flash controller and a plurality of flash chips, the flash controller comprising a state machine, the method comprises:

when the data storage device is powered on, identifying the flash chips by the state machine to acquire a chip information of the flash chips;

establishing a target table by the state machine according to the chip information;

realizing the FTL function of the flash controller by the state machine according to the target table, wherein the FTL function comprises an address mapping function, a bad block management function and a garbage collection function, wherein:

the state machine, a plurality of low-density parity check codes (LDPC), and a plurality of NAND flash controllers (NFC) are integrated inside the flash controller;

each of the plurality of LDPC and each of the plurality of NFC correspond to one of the plurality of the flash chips and one of a plurality of channels, wherein the channels comprise a management channel and a plurality of data channels;

one of the plurality of flash chips corresponds to the management channel;

the others of the plurality of flash chips correspond to the plurality of data channels;

the management channel is out of band, not occupying data bandwidth;

before the method is implemented, an initialization action is first completed to establish a block or page based table.

2. The hardware-based flash FTL function realization method in claim 1, further comprising identifying the flash chips by the state machine to acquire the chip information of the flash chips, wherein the identifying step comprises steps of:

adopting one of the channels and a chip selection unit by the state machine to read a ID and manufacturer information of the flash chips; and searching a preset hardware table according to the ID and the manufacturer information to acquire the chip information of the flash chips.

3. The hardware-based flash FTL function realization method in claim 2, wherein:

the chip information comprises the block number, block size, page number and page size of the flash chips;

the target table comprises a first table and a second table;

the first table is established according to the blocks of all the flash chips on each channel; and the second table is established according to the pages of the flash chips.

4. The hardware-based flash FTL function realization method in claim 3, wherein realizing the address mapping function by the state machine according to the target table comprises:
  adopting a first index by the state machine to search the first table or the second table; and
  adopting a second index to compare with a logic address to realize the address mapping function.

5. The hardware-based flash FTL function realization method in claim 3, wherein:
  the second table is used for managing the states of the pages; and
  realizing the bad block management function by the state machine according to the target table comprises: determining the state of each page by the state machine according to the number of bad bits on each page in the second table and an error correction code technique; and realizing the bad block management function according the state of each page.

6. The hardware-based flash FTL function realization method in claim 3, wherein:
  the second table is used for managing the use and allocation of the pages; and
  realizing the garbage collection function by the state machine according to the target table comprises: determining a wear leveling value by the state machine according to the first table; and realizing the garbage collection function according to the wear leveling value.

7. The hardware-based flash FTL function realization method in claim 6, further comprising establishing a series by the state machine according to a garbage collection result.

8. A data storage device, comprising a data interaction flash controller and a plurality of flash chips, wherein the flash controller comprises a state machine, and the state machine is used for:
  when the data storage device is powered on, identifying the flash chips to acquire a chip information of the flash chips;
  establishing a target table according to the chip information;
  realizing the FTL function of the flash controller according to the target table, wherein:
    the FTL function comprises an address mapping function, a bad block management function and a garbage collection function;
    the state machine, a plurality of low-density parity check codes (LDPC), and a plurality of NAND flash controllers (NFC) are integrated inside the flash controller;
    each of the plurality of LDPC and each of the plurality of NFC correspond to one of the plurality of the flash chips and one of a plurality of channels, wherein the channels comprise a management channel and a plurality of data channels;
    one of the plurality of flash chips corresponds to the management channel;
    the others of the plurality of flash chips correspond to the plurality of data channels;
    the management channel is out of band, not occupying data bandwidth;
    before the data storage device is powered on, an initialization action is first completed to establish a block or page based table.

9. The data storage device in claim 8, wherein the state machine is further used for:
  adopting one of the channels and a chip selection unit to read a ID and manufacturer information of the flash chips;
  searching a preset hardware table according to the ID and the manufacturer information to acquire the chip information of the flash chips; and
  uploading the chip information to the flash chips.

10. The data storage device in claim 9, wherein:
  the target table comprises a first table and a second table;
  the first table is established according to the blocks of all the flash chips on each channel;
  the second table is established according to the pages of the flash chips; and
  the state machine is further used for:
  adopting a first index to search the first table or the second table, and adopting a second index to compare with a logic address to realize the address mapping function;
  realizing the bad block management function according to the number of bad bits on each page in the second table and an error correction code technique; and
  determining a wear leveling value according to the first table, and realizing the garbage collection function according to the wear leveling value.

* * * * *